United States Patent [19]
Wöllner et al.

[11] 3,720,636
[45] March 13, 1973

[54] AQUEOUS DISPERSION PAINTS OF COPOLYMERS OF DIESTERS OF FUMARIC ACID WITH VINYL COMPOUNDS

[75] Inventors: Johannes Wöllner, Kapellen, Wolfgang Tietz, Hamburg, both of Germany

[73] Assignee: Deutsche Texaco Aktiengesellschaft, Hamburg, West Germany

[22] Filed: Sept. 24, 1970

[21] Appl. No.: 75,247

[30] Foreign Application Priority Data

Oct. 1, 1969 Germany..................P 19 49 497.4

[52] U.S. Cl.....................260/29.6 T, 260/31.8 XA, 260/31.8 PQ, 260/78.5 HC, 260/78.5 BB, 260/78.5 UA, 260/78 B
[51] Int. Cl................................................C08f 29/38
[58] Field of Search...260/29.6 T, 78.5 HC, 78.5 BB, 260/78.5 UA, 78.5 B, 78.5 E, 31.8 XA, 31.8 PQ

[56] References Cited

UNITED STATES PATENTS

| | | | |
|---|---|---|---|
| 2,537,016 | 1/1951 | Barrett.........................260/78.5 HC |
| 3,314,908 | 4/1967 | Kagan et al......................260/29.6 T |
| 3,449,300 | 6/1969 | Slocombe et al.................260/29.6 T |

OTHER PUBLICATIONS

L. F. Vanderburgh et al., Jour. of Polymer Sci. (Part A, Vol. 3) pp. 575-581, 1965.

Primary Examiner—William H. Short
Assistant Examiner—L. M. Phynes
Attorney—Thomas H. Whaley, Carl G. Reis and Robert A. Kulason

[57] ABSTRACT

Dispersion paint compositions prepared by emulsion-copolymerization of fumaric acid esters of aliphatic alcohols with aliphatic and/or aromatic vinyl compounds, olefins or olefinic-unsaturated compounds.

4 Claims, No Drawings

AQUEOUS DISPERSION PAINTS OF COPOLYMERS OF DIESTERS OF FUMARIC ACID WITH VINYL COMPOUNDS

BACKGROUND OF INVENTION

Dispersion paints have been produced by emulsion-polymerization of monomeric mono-olefinic unsaturated compounds, of which the most commonly used comprise vinyl chloride, vinyl acetate, vinyl propionate, esters of acrylic and methacrylic acids, isobutylene, and the like. Furthermore, certain properties of such dispersions have been improved by subjecting the mixtures of such monomers to emulsion-polymerization and admixing, if desired, internal and/or external plasticizers, stabilizers and other auxiliary materials.

Of the many conventional processes the one described in the German Auslegeschrift 1 092 656 is given here as an example. As herein described, suitable dispersion paints may be obtained from homo- or copolymerized dispersions being derived from either vinyl acetate alone or a mixture comprising vinyl acetate and di-n-butyl maleinate in the molar ratio of 3:1 and 3:2 and a specific emulsifier.

According to the process of the German Auslegeschrift 1 197 626 vinyl ester latices which are useful for adhesive agents or paints may be obtained by emulsion polymerization and a specific emulsifier from vinyl esters such as vinyl acetate, vinyl propionate or vinyl butyrate as the main monomeric components. Suitable copolymers which are useful for modifying the process include, according to the Auslegeschrift heretofore mentioned, vinyl chloride, vinylidene chloride, acrylonitrile, di-n-hexyl-maleate, dibutyl-maleate, and other di-alkyl esters of maleic and fumaric acid, as well as vinyl alkyl ether. Esters of the fumaric acid so far involved in the above known processes always constitute the minor components of the mixtures of monomers.

Further polymers and copolymers have been known in which the esters of unsaturated dicarboxylic acids are the main monomeric components. According to the German Pat. specification No. 1 176 871, fumarates of secondary aliphatic alcohols have been (co-)polymerized in the presence of radical-forming catalysts, according to the block polymerization method. The products obtained by this method are, however, not suitable as dispersion paints. The first additional application No. P 15 20 702.0 to the aforementioned German patent describes, among others, the emulsion-copolymerization of di-isopropyl-fumarate with styrene in the ratio of 75:25, leading to a white copolymer obtained after 72 hours of treatment at 90°C. and decomposition of the emulsion; this copolymer is not suitable as dispersion paint.

According to the second additional application (Offenlegungsschrift 1 520 703) to said DBP 1 176 871, as esters for the production of homo- or copolymers from esters of alpha-beta-unsaturated dicarboxylic acids the fumaric acid diesters of tertiary aliphatic alcohols should be used because they polymerize much faster than the esters of secondary alcohols.

In another embodiment of the process of the aforementioned additional applications, which forms the object of the German Pat. application No. P 16 45 212.3-44, fumaric acid diesters of secondary and/or tertiary alcohols comprising at least 1 weight percent of an olefin are subjected to block polymerization, thus giving the products derived from said process the necessary properties needed for their use as lacquer raw materials.

SUMMARY OF INVENTION

We have discovered and this constitutes our invention novel dispersion paints of outstanding properties prepared by emulsion-copolymerization of the fumaric acid diesters of aliphatic alcohols, as the main components, with olefins and/or vinyl compounds, wherein the monomeric mixture has a definite composition.

DETAILED DESCRIPTION OF THE INVENTION

Specifically, the dispersion paints herein are prepared by the emulsion-copolymerization of a mixture of monomers, said mixture consisting essentially of:

a. 50-90 parts by weight of fumaric acid diester of an alkanol of from three to six carbons of the formula ROH where R is secondary alkyl or tertiary alkyl, b. 0-10 parts by weight of an alkene having 2-8, preferably two to four carbon atoms, such as ethene, propene and octene c. 3-25 parts by weight of a vinyl compound, preferably styrene, acrylic or alkacrylic acid ester of the formula:

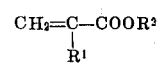

where R is hydrogen or alkyl of from one to five carbons and $R^2$ is alkyl of from one to 20 carbons such as n-butylmethacrylate and tridecylacrylate.

d. 5-20 parts by weight of fumaric acid diester of a primary alkanol of from four to eight carbon atoms.

The emulsion-polymerization technique to manufacture the dispersion paints contemplated herein have heretofore been covered in the background discussion.

The invention is illustrated in the following examples:

EXAMPLE 1

Preparation of a flat finish

A mixture is produced in a two liter autoclave equipped with stirrer, comprising:
  80 parts by weight di-isopropyl fumarate
  5 parts by weight styrene
  15 parts by weight di-n-butyl fumarate
  10 parts by weight di-n-butyl phthalate
  0.5 parts by weight di-benzoyl peroxide (75 percent paste)
This mixture is mixed with a solution comprising
  3.0 parts by weight potassium persulfate
  2.5 parts by weight Na-n-octyl sulfate
  2.5 parts by weight polyvinyl alcohol (type N 50–98)
  1.1 parts by weight ammonia (28 percent aqueous solution) dissolved in
  120 parts by weight water.
The autoclave is flushed with nitrogen three times and then connected to a propylene bomb being kept at room temperature The pressure which develops in the autoclave is about 10 atm (142 psig). The contents are heated with constant stirring at 500 rpm to a temperature of 80°C. (176°F.), which is maintained for a period of 20 hours. (After this period the initial viscosity of 0.4 cP had increased to 16 cP). Subsequently the temperature is increased to 95°C. (203°F.) for a period of 2 hours. Now, after disconnecting the propylene bomb from the autoclave, the excess propylene carefully is blown off from the hot dispersion. This is followed by flushing the autoclave with nitrogen three times and leaving it to cool down. The dispersion then is drawn off, and by adding aqueous ammonia it is adjusted to a $p_H$-value of between 7 and 8; the dispersion now has a solid content of about 50 weight percent. This dispersion, yielding flat finishes, is referred to hereinafter as Dispersion A. It has a viscosity of 26–29 seconds in the 4mm DIN-standard beaker at a temperature of 20°C. (68°F.). As is shown by the analysis, about 5 weight percent propene units have been incorporated in the copolymer.

EXAMPLE 2

Preparation of a gloss dispersion

The method of Example 1 is repeated to produce another dispersion, Dispersion B, having the following composition:

a. organic phase:
60 parts by weight di-sec.-butyl fumarate
20 parts by weight styrene
20 parts by weight di-n-octyl fumarate
0.5 parts by weight di-benzoyl peroxide (75% paste)

b. aqueous phase:
10 parts by weight Na-dodecyl-benzene sulfonate
3 parts by weight potassium persulfate
1.5 parts by weight $NaHCO_3$
115 parts by weight water Dispersion B also has a solid content of about 50 weight percent and yields high-gloss coatings.

EXAMPLE 3

Dispersions A and B prepared according to Examples 1 and 2 are compared with three commercial dispersions, Dispersion C chosen for the comparison consists of a polyvinyl acetate homopolymer. It has a solid content of 54 weight percent, including 10.8 weight percent dibutyl phthalate plasticizer (or 25 percent based upon the polymer). The $p_H$-value of this dispersion is 3–4, its viscosity measured at 20°C. (68°F.) in the Hoeppler-viscosimeter is 200 to 600 poises, and the particle size ranges between 0.5 and 5, preferably between 1 and 3.

Dispersion D chosen for the comparison consists of a finely dispersed and plasticizer-free emulsion-copolymer of vinyl propionate, having a $p_H$-value of between 7 and 9, a solid content of about 50 weight percent, a viscosity of 12–18 seconds in the 4mm DIN-standard beaker, a density $d_4^{20}$ of about 1.1, and a medium particle size ranging between 0.1 and 0.2.

Gloss Dispersion E chosen for the comparison consists of a plasticizer-free and solvent-free acrylate copolymer having a solid content of about 50 weight percent, a $p_H$-value ranging between 7.5 and 9, a medium particle size of 0.1, density $d_4^{20}$ of the dispersion of about 10.8, density $d_4^{20}$ of the polymer of about 10.4, and a viscosity of between 5 and 15 poises measured in the Epp-recht-viscosimeter STV, measuring element C, stage III.

The film-forming points and the critical pigment-volume concentration (cpvc) of the five dispersions were determined:

TABLE I

| Dispersion | film-forming point (°C.) (no pigmentation) | cpvc |
|---|---|---|
| A | 3 | about 57.5 |
| B | 2 | about 52.5 |
| C | 2 | about 50 |
| D | 4 | about 52.5 |
| E | 22 | about 60 |

The film-forming point is an indication of the temperature at which the aqueous dispersion applied as paint still forms an intact consistent film. Below said film-forming point a white, brittle and inconsistent film is obtained. To measure this film-forming property the dispersion was applied on a metal plate which, by cooling and heating means, could be adjusted to a temperature of between −5° and +40°C. (23° to 104°F.). By an airstream being passed slowly over the dispersion a faster evaporation of the water contained therein was achieved. This measuring method is inaccurate ± 2 percent.

The critical pigment-volume concentration (according to Ind. Eng. Chem. 41 (1949), p. 1470) is determined in the dispersion A-E being pigmented with $TiO_2$ in an increasing concentration being applied as a film and the film subsequently coated with a high-gloss alkyd resin lacquer film having a determined layer thickness. The gloss value of the alkyd resin lacquer layer is measured; it decreases steeply at the critical pigment-volume concentration. The cpvc values obtained are inaccurate approximately 5–8 percent. The gloss value attained in a dispersion having 30 weight percent of pigment was set equal to 100 percent.

The "pendulum" hardness of the Dispersions A-E was measured by Konig's pendulum test after 24 hours:

TABLE II

"Pendulum" Hardness (seconds)

| Dispersion | no pigmentation | | pignmentation | |
|---|---|---|---|---|
| | 100μ | 200μ wet coating | 100μ | 200μ |
| A | 14 | 9 | 38 | 28 |
| B | 16 | 10 | 41 | 28 |
| C | 8 | 5 | 35 | 24 |
| D | 5 | 3 | 33 | 25 |
| E | 64 | 40 | 90 | 59 |

The pigments used for measuring the pendulum hardness comprised $TiO_2$ (RN 45) and chalk in a weight ratio of 1 to 4 (cpvc = 45 percent).

The gloss dispersions, Dispersions B and E, were compared with each other for their gloss value below 45°, according to B. Lange (pigmentation with $TiO_2$/chalk): (cpvc = 30%):

| Dispersion | Gloss Value |
|---|---|
| B | 70% |
| E | 82% |

From these and numerous other comparative tests concerning the dry and wet abrasion resistance, resistance to gasoline, diesel oil and the like, to water and solvents, compatibility with plasticizers, thickening agents and the like, the following conclusions may be drawn:

Dispersions A and B prepared according to this invention are not inferior to their commercial equivalents C, D, E, with regard to some important properties as paints, and in some of these properties they are even superior to the commercial dispersions.

It may be noted here that the composition of Dispersions A and B prepared according to Examples 1 and 2 is optimal. However the fumaric acid ester portion of the monomeric starting mixture for the dispersion paints prepared according to this invention surely may be maintained between about 50 and about 90 parts by weight. The portion of styrene and the like in the mixture may be between 3 and 25 parts by weight, which may be increased to over 25 parts by weight in the case of an increased desirable hardness. The lower olefin, e.g., propene, which gives the paint a clear effect and transparency should be present in a proportion of between 1 and 10 parts by weight. The proportion of the fumarate of a higher aliphatic normal alcohol, e.g. n-butanol or n-octanol, also may vary between 5 and 20 parts by weight, depending on the desirable degree of elasticity of the dispersion paints. The flexibility, too, of these paints may be adjusted as desired by adding 2.5 to 15 parts by weight of an external plasticizer such as di-n-butyl phthalate.

It is known to be an advantage to add the catalyst, e.g., persulfate, not only in the aqueous phase of emulsion-polymerization. As described in above examples it is possible, by adding an initiator (e.g., di-benzoyl peroxide) to the monomeric mixture to reduce both the viscosity of the dispersion and its monomer contents, so that a dispersion having high solid contents despite its comparatively low viscosity is obtained.

Further advantages of the dispersions prepared according to this invention are their good colorfastness and fastness to yellowing, which were confirmed by the comparison with commercial products, and also their excellent adhesion to grounds of various types, which allows to successfully apply a new coat of paint on old ones like alkyd resin or oil paints; this is not possible with many of the commercial disperse paints. The adhesion of the dispersions prepared according to this invention on old grounds is seen to be excellent.

We claim:

1. An aqueous dispersion paint composition prepared by aqueous emulsion-copolymerization of a monomeric mixture consisting essentially of the following:
   a. 50–90 parts by weight of a diester of fumaric acid with an alkanol of three to six carbons of the formula ROH where R is secondary alkyl of tertiary alkyl,
   b. 0–10 parts by weight of an alkene of from two to eight carbons,
   c. 3–25 parts by weight of a vinyl compound selected from the group consisting of styrene and acrylic acid ester of the formula:

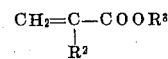

where $R^2$ is hydrogen or alkyl of from one to five carbons and $R^3$ is alkyl of from one to 20 carbons,
   d. 5–20 parts by weight diester of fumaric acid with a primary alcohol of from four to eight carbons.

2. A composition according to claim 1 wherein said composition consists of:
   60 parts by weight di-sec.-butyl fumarate
   20 parts by weight styrene
   20 parts by weight di-n-octyl fumarate.

3. A composition according to claim 1 also containing 5–20 parts of an external plasticizer.

4. A composition according to claim 3 wherein said external plasticizer is di-n-butyl phthalate.

* * * * *